United States Patent

Osberger

(10) Patent No.: US 6,738,099 B2
(45) Date of Patent: May 18, 2004

(54) ROBUST CAMERA MOTION ESTIMATION FOR VIDEO SEQUENCES

(75) Inventor: Wilfried M. Osberger, Portland, OR (US)

(73) Assignee: Tektronix, Inc., Beaverton, OR (US)

(*) Notice: Subject to any disclaimer, the term of this patent is extended or adjusted under 35 U.S.C. 154(b) by 401 days.

(21) Appl. No.: 09/788,135

(22) Filed: Feb. 16, 2001

(65) Prior Publication Data

US 2002/0113901 A1 Aug. 22, 2002

(51) Int. Cl.$^7$ .............. H04N 7/12; H04N 9/64; G06K 9/36
(52) U.S. Cl. ............ 348/699; 375/240.16; 382/236
(58) Field of Search ............ 375/240.16; 382/236, 382/238; 348/699–700

(56) References Cited

U.S. PATENT DOCUMENTS

| | | | | |
|---|---|---|---|---|
| 5,471,252 A | * | 11/1995 | Iu | 348/699 |
| 5,973,733 A | * | 10/1999 | Gove | 348/208.13 |
| 6,278,736 B1 | * | 8/2001 | De Haan et al. | 375/240.16 |
| 6,307,959 B1 | * | 10/2001 | Mandelbaum et al. | 382/154 |
| 6,385,245 B1 | * | 5/2002 | De Haan et al. | 375/240.16 |
| 6,473,462 B1 | * | 10/2002 | Chevance et al. | 375/240.16 |
| 6,487,304 B1 | * | 11/2002 | Szeliski | 382/107 |
| 6,507,617 B1 | * | 1/2003 | Karczewicz et al. | 375/240.16 |
| 6,526,096 B2 | * | 2/2003 | Lainema et al. | 375/240.16 |
| 6,594,397 B1 | * | 7/2003 | Hu | 382/236 |
| 2003/0113031 A1 | * | 6/2003 | Wal | 382/260 |

OTHER PUBLICATIONS

R. Wang and T. Huang, "Fast Camera Motion Analysis in MPEG Domain", Proceedings ICIP, Kobe, Japan, Oct. 1996, pp. 691–694.

Y.T. Tse and R.L. Baker, "Global Zoom/Pan Estimation and Compensation for Video Compression", Proceedings ICASSP, Toronto, Canada, 1991, vol. 4, pp. 2725–2728.

W. Rabiner and A. Jacquin, "Motion–Adaptive Modeling for Scene Content for Very Low Bit Rate Model–Assisted Coding of Video", Journal of Visual Communication and Image Representation, 8(3), pp. 250–262, 1997.

D. Adoph and R. Buschmann, "1.15 Mbit/s Coding of Video Signals Including Global Motion Compensation", Signal Processing: Image Communication, vol. 3, pp. 259–274, 1991.

(List continued on next page.)

*Primary Examiner*—Gims Philippe
(74) *Attorney, Agent, or Firm*—Francis I. Gray

(57) ABSTRACT

A robust technique for estimating camera motion parameters calculates the motion vectors for a current frame vis a vis a previous frame using a multi-scale block matching technique. The means of the motion vectors for the current and the previous frames are compared for a temporal discontinuity, the detection of such temporal discontinuity as a temporal repetition, such as frozen field or 3:2 pulldown, terminating the processing of the current frame with the camera motion parameter estimate for the previous frame being used for the current frame. Otherwise motion vectors for spatially flat areas and text/graphic overlay areas are discarded and an error-of-fit for the previous frame is tested to determine initial parameters for an iterative camera motion estimation process. If the error-of-fit is less than a predetermined threshold, then the camera motion parameters for the previous frame are used as the initial parameters, otherwise a best least squares fit is used as the initial parameters. Outlier motion vectors are removed and the camera motion parameters are recalculated using a least squares best fit in an iterative process until either the error-of-fit for the current frame is less than the predetermined threshold or the number of iterations exceeds a maximum. The estimated camera motion parameters and associated error-of-fit are provided as an output.

30 Claims, 1 Drawing Sheet

OTHER PUBLICATIONS

H. Kim, T–H. Kwon, W.M. Kim, B–D. Kim and S.M–H Song, "A Fast Algorithm for Detection of Camera Motion", Proceedings SPIE 3303—Real–Time Imaging III, San Jose, USA, Jan. 1998, pp. 78–87.

F. Moscheni, F. Dufaux and M. Kunt, "A New Two–Stage Global/Local Motion Estimation Based on a Background/Foreground Segmentation", Proceedings ICIP, Lausanne, Switzerland, Sep. 1996, pp. 2261–2264.

S. Mann and R.W. Picard, "Video Orbits of the Projective Group: A New Perspective on Image Mosaicing", IEEE Transactions on Image Processing, 6(9), pp. 1281–1295, 1997.

M. Pilu, "On Using Raw MPEG Motion Vectors to Determine Global Camera Motion", Proceedings SPIE 3309—Visual Communications and Image Processing, San Jose, USA, Jan. 1998, pp. 448–459.

Y–P. Tan, D.D. Saur and S.R. Kulkarni, "Rapid Estimation of Camera Motion from Compressed Video with Application to Video Annotation", IEEE Transactions on Circuits and Systems for Video Technology, 10(1), pp. 133–146, Feb. 2000.

S.J.P. Westen, R.I. Lagendijk and J. Biemond, "Spatio–Temporal Model of Human Vision for Digital Video Compression", SPIE vol. 3016, pp. 260–268.

* cited by examiner

ROBUST CAMERA MOTION ESTIMATION FOR VIDEO SEQUENCES

BACKGROUND OF THE INVENTION

The present invention relates to the processing of video sequences, and more particularly to a robust, accurate and computationally inexpensive method of estimating camera motion for a wide range of video sequences.

A number of different video processing applications depend upon an accurate estimate of camera motion, i.e., the movement of the camera relative to a scene while a video sequence is being recorded or shot. The camera motion parameters typically required are pan (horizontal movement), tilt (vertical movement), zoom (depth movement) and rotation. In most situations this information is not explicitly available and needs to be calculated by processing the video sequence. Once knowledge of the camera motion is obtained, then compensation may be performed, enabling the extraction of objects and the calculation of true object motion within the scene. The number of applications that may make use of such a camera motion model is continually growing and includes video compression, object tracking, scene analysis and foreground/background detection.

A number of camera motion estimation techniques have been proposed in the technical literature. However all of these techniques contain a number of deficiencies. Some models only produce a three parameter estimate of camera motion and therefore fail whenever the camera undergoes any rotational motion. The method described in "A Fast Algorithm for Detection of Camera Motion" by H. Kim et al, Proceedings SPIE 3303-Real-time Imaging III, San Jose, USA, pp. 78–87, January 1998 provides an indication of whether or not camera motion is present, but fails to give a quantitative estimate of the magnitude of the motion. Other models use an 8-parameter model that is both exceedingly computationally expensive and provides more parameters than are necessary for the types of applications mentioned above. Some models rely on the use of Motion Picture Engineering Group (MPEG) motion vectors (MVs) as inputs. However this causes a number of problems: (a) the MVs are not available for I frames and also for many macroblocks in P and B frames; and (b) standard block-based MVs are very noisy and often differ significantly from the true object motion.

Most camera motion models converge to an estimate of the camera motion parameters in an iterative manner. In this approach MVs of objects that do not conform to the global camera motion model, i.e., foreground and moving objects, are iteratively removed and a new estimate of the camera motion parameters is calculated using only the remaining objects. This process is crucial to the overall accuracy and robustness of the model. Local motion estimates may be very noisy in areas of low spatial detail in the scene and therefore should not be used. Of the other models found in the literature only the model described in "On Using Raw MPEG Motion Vectors to Determine Global Camera Motion" by M. Pilu, Proceedings SPIE 3309-Visual Communications and Image Processing, San Jose, USA, pp. 448–459, January 1998 performs a similar removal of MVs in areas of low spatial detail. Another shortcoming of previous models is the choice of the starting values for the camera motion parameters during the iteration process. The previous models use the values found from a Least Squares (LS) estimate during the first iteration. This works fine for video where the background dominates the scene. However in video with strong foreground motion this initial estimate may be inaccurate and may result in the model converging to an incorrect estimate of camera motion. Finally previous models do not have a mechanism for handling video that has temporal repetition, such as frame repeat or 3:2 pulldown.

What is desired is a robust camera motion estimation method for video sequences that is accurate and computationally inexpensive.

BRIEF SUMMARY OF THE INVENTION

Accordingly the present invention provides a robust camera motion estimation method for video sequences that calculates from a current and previous frame of the video sequence motion vectors for the current frame using a multi-scale block matching technique. The means of the motion vectors for the current and previous frames are compared to detect temporal discontinuities, the detection of which ends the processing of the current frame and, when the discontinuity is a temporal repetition such as frozen frame or 3:2 pulldown, uses the camera motion parameters from the previous frame for the current frame. Otherwise motion vectors for spatially flat areas and text/graphic overlay areas are removed and an error-of-fit for the previous frame is tested to determine what initial estimate to use for camera motion parameters in an iterative estimation process. If the error-of-fit is less than a predetermined threshold, then the previous frame's camera motion parameters are used as the initial estimate, otherwise a least squares best fit is used. Outlier motion vectors are removed and the camera motion parameters are calculated in the iterative estimation process until either the error-of-fit is less than the predetermined threshold or the number of iterations has exceeded a maximum. The outputs are the estimated camera motion parameters and the associated error-of-fit.

The objects, advantages and other novel features of the present invention are apparent from the following detailed description when read in conjunction with the appended claims and attached drawing.

DETAILED DESCRIPTION OF THE INVENTION

Figure 1:
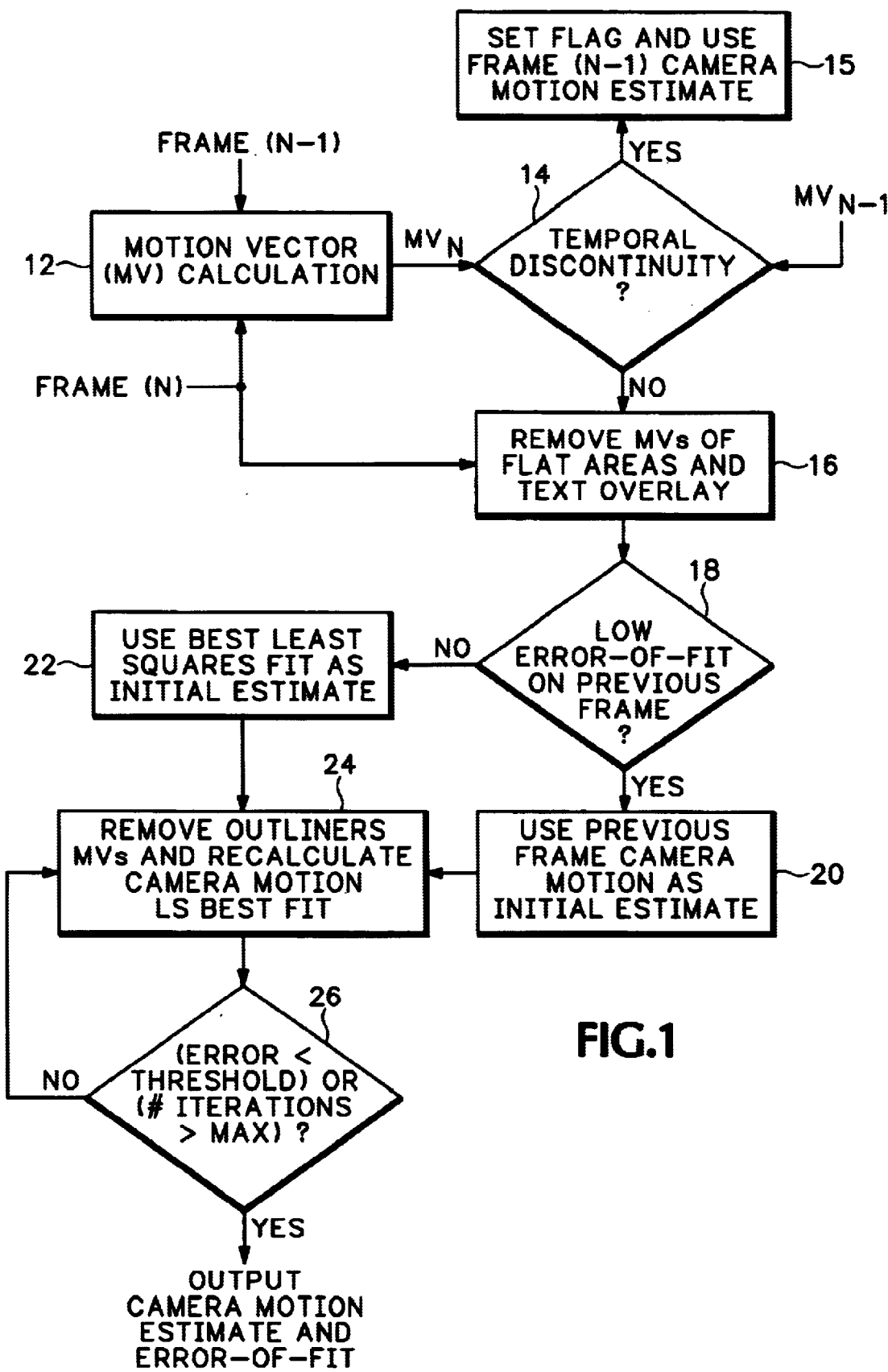
FIG. 1 is flow diagram view of a robust camera motion estimation method for video sequences according to the present invention.

The camera motion estimation model described below provides a robust, accurate and computationally inexpensive way to estimate camera motion parameters, such as pan, tilt, zoom and rotation, for a wide range of video sequences. The video sequences represent a scene or series of scenes having a background (fixed objects far from the camera), a foreground (fixed objects near the camera) and moving objects. The model accepts raw digital video material as input and is not restricted to any particular type of scene or video format. The model outputs the estimated camera motion parameters extracted from the background of the scene, as well as an error of prediction or error-of-fit which provides a useful measure of confidence of how accurately the camera motion parameters fit the video data.

Referring now to FIG. 1 a current and a previous frame of the video sequence are input to a motion vector calculation module 12 to produce motion vectors (MVs) for the current frame. The MV calculation module 12 uses a multi-scale block matching technique designed to produce low-noise MVs that match true object motion more closely than standard block matching techniques. This is accomplished via a block matching process between the current and previous frames. To produce a motion field that corresponds more closely with actual object motion, a technique of successive refinement similar to that suggested by Westen et al in "Spatio-Temporal Model of Human Vision for Digital Video Compression", SPIE Vol. 3016, pgs. 260–268 (1997) is adopted. The motion vectors are first calculated at a coarse resolution, such as 64×64 or 32×32 pixels depending upon the size of the image, using a minimum mean absolute difference (MAD) block matching algorithm, weighted slightly to favor zero motion to reduce noise effects. The resolution of the motion vectors is then increased successively by a factor of two until a motion vector is obtained at the 8×8 pixel level. During this refinement process the choice of motion vector for a block is constrained to be either its previous value or the value of one of its four neighboring blocks, whichever provides the best match in terms of MAD. This successive refinement procedure produces a good estimate of actual object motion and is robust against noise in the image.

The mean motion of the current frame is compared to that of the previous frame at module 14 to determine if there is a temporal discontinuity between the consecutive frames, such as may be caused by temporal repetition, i.e., frozen fields or 3:2 pulldown. If the temporal discontinuity is a temporal repetition, the processing of the current frame is complete, a flag is set and the previous frame's camera motion estimate is output 15. The temporal discontinuity algorithm for temporal repetition may be implemented as follows:

IF [(mean(MV(previous_valid_frame))>0 AND ((mean(MV(current))/mean(MV(previous_valid_frame))) <MVthresh)]
THEN temporal_discontinuity=true -> set flag and use previous frame's estimate
ELSE no_temporal_discontinuity, continue to next step
where "previous_valid_frame" refers to the previous frame that did not have a temporal discontinuity, so it is not necessarily the previous frame. A typical value for MVthresh may be 0.2. The temporal discontinuity module 14 may be used to detect scene changes by determining when the difference in means for the MVs between the current frame and the previous frame is greater than another threshold, in which case the current frame is treated as the first frame of a new scene or sequence. However scene changes also are detected inherently as indicated below.

The next module 16 discards MVs in areas that are spatially flat since MVs in these areas are inherently unreliable. A spatially flat area is one where variation of the luminance in the motion vector block is less than a given threshold. The frame is broken into small blocks, such as 8×8 pixel blocks. For each block the difference between the maximum and minimum gray level is calculated. If this difference is below a threshold, the block is considered flat, else it is considered non-flat. A value for the threshold may be on the order of 20 where the gray scale intensity values range from 0–255. Also since text overlay often occurs in the lower portion of the video, i.e., from line 400 onwards in NTSC video, MVs from these regions are discarded. Finally MVs from the boundary of the frame are discarded since these MVs often have spurious values.

At this stage a choice of starting value for an iterative camera motion estimation process is made in module 18. Accurate convergence during the iterative process is dependent upon a good choice of initial camera motion parameters. The previous frame's camera motion parameters are used as an initial estimate by module 20 if the prior frame's error-of-fit, i.e., variation of the MVs of the prior frame from the estimated camera motion parameters, is below a predetermined threshold. This enables temporally smooth camera motion from frame to frame and promotes convergence to a correct solution in scenes where there are a large number of moving foreground objects. If however the previous frame's error-of-fit is high, such as when the current frame is the first frame of a scene or sequence, then the initial camera motion estimate is obtained by doing a Least Squares (LS) fit to the MVs in module 22. The next module 24 removes outlier MVs, i.e., MVs that are noisy or which represent objects moving within the scene, using an 80% confidence interval for an estimated Gaussian distribution where the initial estimate is from the LS fit module 22 and a 90% confidence interval otherwise. In other words those MVs at the edges of the Gaussian distribution are removed. After outlier MV removal the camera motion parameters are recalculated using the LS fit. This is an iterative process where for each iteration additional outlier MVs are removed and the LS fit recalculated. The termination of the iterative process is determined by the next module 26. If either the error-of-fit is less than the predetermined threshold or a maximum number of iterations, such as 3–4, is exceeded, the iterative process terminates and the processing for the current frame is complete. The outputs are both the estimate of camera motion parameters (pan, tilt, zoom and rotation) and the associated error-of-fit obtained using these parameters. The error-of-fit is a useful measure of confidence in the accuracy of the estimated camera motion parameters.

Thus the present invention provides a camera motion estimation technique for obtaining pan, tilt, zoom and rotation by obtaining the motion vectors, looking for a temporal discontinuity between frames, removing motion vectors for spatially flat and text/graphic overlay areas, using the previous frame's camera motion parameters as an initial estimate in an iterative process, and outputting the camera motion parameters and an associated error-of-fit for the current frame when the error-of-fit is less than a predetermined threshold or the number of iterations reaches a maximum.

What is claimed is:

1. A method of estimating camera motion parameters from a video sequence comprising the steps of:

generating a set of motion vectors for a current frame of the video sequence as a function of the current frame and a previous frame of the video sequence using a multi-scale block matching technique;

determining an initial estimate of the camera motion parameters as a function of an error-of-fit for the previous frame; and refining the initial estimate of the camera motion parameters in an iterative process to provide as an output camera motion parameters and an error-of-fit for the current frame.

2. The method as recited in claim 1 wherein the generating step comprises the steps of:

calculating an initial set of motion vectors for the current frame as a function of the current and previous frames; and removing unreliable motion vectors from the initial set of motion vectors to produce the set of motion vectors for the current frame.

3. The method as recited in claim 2 wherein the generating step further comprises the step of detecting a temporal repetition between the current frame and a previous valid frame that did not have the temporal repetition such that when the temporal repetition is detected the camera motion parameters for the current frame are set to those of the previous valid frame.

4. The method as recited in claim 3 wherein the detecting step comprises the steps of:

determining the mean of the motion vectors for the current frame and the previous valid frame; and comparing the means such that if the mean for the previous valid frame is greater than zero and the ratio of the means for the current frame relative to the previous valid frame is less than a specified threshold, then the temporal repetition is detected.

5. The method as recited in claim 2 wherein the calculating step comprises the steps of:

calculating a coarse set of motion vectors using a minimum mean absolute difference block matching algorithm; and iteratively increasing the resolution of the coarse set of motion vectors by a factor of two until the initial set of motion vectors is achieved at a specified level.

6. The method as recited in claim 5 wherein the minimum mean absolute difference block matching algorithm is weighted to favor zero motion.

7. The method as recited in claim 5 wherein the iteratively increasing step comprises the step of choosing the motion vector for a block in the block matching algorithm from the group consisting of the previous motion vector for the block prior to factoring and the motion vectors for the four neighboring blocks after factoring.

8. The method as recited in claim 1 wherein the determining step comprises the steps of:

comparing the error-of-fit for the previous frame with a predetermined threshold;

selecting the camera motion parameters for the previous frame as the initial camera motion parameters if the error-of-fit is less than the predetermined threshold; and otherwise calculating the initial camera motion parameters from the set of motion vectors for the current frame.

9. The method as recited in claim 8 wherein the otherwise calculating step uses a best least squares fit to calculate the initial camera motion parameters.

10. The method as recited in claim 8 wherein the generating step comprises the steps of:

calculating an initial set of motion vectors for the current frame as a function of the current and previous frames; and removing unreliable motion vectors from the initial set of motion vectors to produce the set of motion vectors for the current frame.

11. The method as recited in claim 10 wherein the generating step further comprises the step of detecting a temporal repetition between the current frame and a previous valid frame that did not have the temporal repetition such that when the temporal repetition is detected the camera motion parameters for the current frame are set to those of the previous valid frame.

12. The method as recited in claim 11 wherein the detecting step comprises the steps of:

determining the mean of the motion vectors for the current frame and the previous valid frame; and comparing the means such that if the mean for the previous valid frame is greater than zero and the ratio of the means for the current frame relative to the previous valid frame is less than a specified threshold, then the temporal repetition is detected.

13. The method as recited in claim 10 wherein the calculating step comprises the steps of:

calculating a coarse set of motion vectors using a minimum mean absolute difference block matching algorithm; and iteratively increasing the resolution of the coarse set of motion vectors by a factor of two until the initial set of motion vectors is achieved at a specified level.

14. The method as recited in claim 13 wherein the minimum mean absolute difference block matching algorithm is weighted to favor zero motion.

15. The method as recited in claim 13 wherein the iteratively increasing step comprises the step of choosing the motion vector for a block in the block matching algorithm from the group consisting of the previous motion vector for the block prior to factoring and the motion vectors for the four neighboring blocks after factoring.

16. The method as recited in claim 1 wherein the refining step comprises the step of recalculating camera motion parameters until the error-of-fit is less than a predetermined threshold or a maximum number of iterations has occurred.

17. The method as recited in claim 16 wherein the recalculating step uses a best least squares fit to calculate the camera motion parameters for each iteration.

18. The method as recited in claim 16 wherein the refining step further comprises the step of removing outlier motion vectors from the set of motion vectors for the current frame prior to the recalculating step for each iteration.

19. The method as recited in claim 18 wherein the outlier motion vectors comprise those that represent a specified percentage of those that fall at the edges of a Gaussian distribution curve for the motion vectors.

20. The method as recited in claim 19 wherein the specified percentage is twenty percent.

21. The method as recited in claim 19 wherein the specified percentage is ten percent.

22. The method as recited in claim 19 wherein the percentage is twenty percent for the first iteration and ten percent for subsequent iterations.

23. The method as recited in claim 16 wherein the determining step comprises the steps of:

comparing the error-of-fit for the previous frame with a predetermined threshold;

selecting the camera motion parameters for the previous frame as the initial camera motion parameters if the error-of-fit is less than the predetermined threshold; and otherwise calculating the initial camera motion parameters from the set of motion vectors for the current frame.

24. The method as recited in claim 23 wherein the otherwise calculating step uses a best least squares fit to calculate the initial camera motion parameters.

25. The method as recited in claim 23 wherein the generating step comprises the steps of:

calculating an initial set of motion vectors for the current frame as a function of the current and previous frames; and removing unreliable motion vectors from the initial set of motion vectors to produce the set of motion vectors for the current frame.

26. The method as recited in claim 25 wherein the generating step further comprises the step of detecting a temporal repetition between the current frame and a previous valid frame that did not have the temporal repetition such that when the temporal repetition is detected the camera motion parameters for the current frame are set to those of the previous valid frame.

27. The method as recited in claim 26 wherein the detecting step comprises the steps of:
    determining the mean of the motion vectors for the current frame and the previous valid frame; and
    comparing the means such that if the mean for the previous valid frame is greater than zero and the ratio of the means for the current frame relative to the previous valid frame is less than a specified threshold, then the temporal repetition is detected.

28. The method as recited in claim 25 wherein the calculating step comprises the steps of:
    calculating a coarse set of motion vectors using a minimum mean absolute difference block matching algorithm; and
    iteratively increasing the resolution of the coarse set of motion vectors by a factor of two until the initial set of motion vectors is achieved at a specified level.

29. The method as recited in claim 28 wherein the minimum mean absolute difference block matching algorithm is weighted to favor zero motion.

30. The method as recited in claim 28 wherein the iteratively increasing step comprises the step of choosing the motion vector for a block in the block matching algorithm from the group consisting of the previous motion vector for the block prior to factoring and the motion vectors for the four neighboring blocks after factoring.

* * * * *